United States Patent
Watson et al.

(10) Patent No.: US 9,716,684 B1
(45) Date of Patent: Jul. 25, 2017

(54) AUTOMATED DELAYED MESSAGE REDELIVERY

(71) Applicant: UNITED SERVICES AUTOMOBILE ASSOCIATION (USAA), San Antonio, TX (US)

(72) Inventors: James C. Watson, San Antonio, TX (US); Frank L. Bain, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 14/959,943

(22) Filed: Dec. 4, 2015

Related U.S. Application Data

(63) Continuation of application No. 13/960,379, filed on Aug. 6, 2013, now Pat. No. 9,210,114, which is a continuation of application No. 13/541,380, filed on Jul. 3, 2012, now Pat. No. 8,504,872, which is a continuation of application No. 13/109,600, filed on May 17, 2011, now Pat. No. 8,214,688, which is a continuation of application No. 11/735,272, filed on Apr. 13, 2007, now Pat. No. 7,945,813.

(60) Provisional application No. 60/870,392, filed on Dec. 16, 2006.

(51) Int. Cl.
*G06F 11/00* (2006.01)
*H04L 12/58* (2006.01)
*H04L 1/18* (2006.01)

(52) U.S. Cl.
CPC .......... *H04L 51/30* (2013.01); *H04L 1/1848* (2013.01)

(58) Field of Classification Search
USPC .......................................................... 714/18
See application file for complete search history.

(56) References Cited

U.S. PATENT DOCUMENTS

| | | | | |
|---|---|---|---|---|
| 2003/0061365 | A1* | 3/2003 | White | G06F 21/6218 709/229 |
| 2007/0038889 | A1* | 2/2007 | Wiggins | G05B 23/0264 714/20 |
| 2007/0050683 | A1* | 3/2007 | Attinella | G06F 11/302 714/47.1 |

* cited by examiner

*Primary Examiner* — Sarai Butler
(74) *Attorney, Agent, or Firm* — Baker Hostetler LLP

(57) ABSTRACT

Method and system are disclosed for redelivering failed messages in asynchronous communication systems. The methods and systems automatically delay redelivery of such failed messages in order to allow required system resources to become available. In one implementation, the methods and systems provide two levels of redelivery: a micro level in which redelivery is attempted right away for a certain number of times, and a macro level in which a predefined, user-selectable delay is imposed before any additional micro level redeliveries are attempted. After a certain number of unsuccessful macro level redeliveries, the message is backed out to a backout queue for manual intervention by a system operator. Such an arrangement reduces or eliminates the burden on the system operator to manually resolve failed message deliveries.

20 Claims, 8 Drawing Sheets

AUTOMATED DELAYED MESSAGE REDELIVERY

CROSS-REFERENCE TO RELATED APPLICATIONS

The present application is a continuation of U.S. patent application Ser. No. 13/960,379, filed Aug. 6, 2013, now U.S. Pat. No. 9,210,114, which is a continuation of U.S. patent application Ser. No. 13/541,380, filed Jul. 3, 2012, now U.S. Pat. No. 8,504,872, which is a continuation of U.S. patent application Ser. No. 13/109,600, filed May 17, 2011, now U.S. Pat. No. 8,214,688, which is a continuation of Ser. No. 11/735,272, filed Apr. 13, 2007, now U.S. Pat. No. 7,945,813, which is based upon and claims the benefit of U.S. Provisional Patent Application No. 60/870,392 filed on Dec. 16, 2006, and is related in subject matter in the following commonly assigned applications: Ser. No. 11/735,276 filed on Apr. 13, 2007 and Ser. No. 11/735,280 filed on Apr. 13, 2007.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to asynchronous communication. In particular, the disclosed embodiments relate to methods and systems for redelivering failed messages in such asynchronous communication.

BACKGROUND

Asynchronous communication refers to the transmission of data between two applications that are essentially independent of one another (i.e., the applications are not synchronized). In asynchronous communication, the sending application is free to transmit data at any time regardless of whether the receiving application is ready to receive the transmission. Such asynchronous communication is widely used to transmit data from device to device, system to system, network to network, and combinations thereof where the devices, systems, networks, and so forth are not directly engaged with one another.

The above arrangement is particularly useful in systems that rely on one-to-many relationships because of the greater scalability such relationships afford. One such system is a so-called "publish/subscribe" system where senders (publishers) do not send (publish) messages to specific receivers (subscribers). Rather, publishers publish messages to certain categories without knowledge of the subscribers (if any), and subscribers subscribe to one or more these categories without knowledge of the publishers (if any). The messages are then filtered and delivered to the subscribers based on either the message topic or the message content, or a combination of the two. In topic-based systems, messages are delivered to named logical channels. Subscribers in such topic-based systems receive all messages published to the channels to which they subscribe. The publisher is responsible for classifying the messages. In content-based systems, messages are only delivered to a subscriber if the attributes or content of those messages match constraints defined by the subscriber. The subscriber is responsible for classifying these messages.

FIG. 1 illustrates an example of a publish/subscribe system 100 where a publisher 102 publishes messages to at least one subscriber 104. The messages typically relate to or contain information about certain events that are of interest to the subscriber 104. A message-oriented middleware (MOM) 106 facilitates delivery of the event messages from the publisher 102 to the subscriber 104. The message-oriented middleware (MOM) 106 determines which category the event message belongs to and transmits the message to a message queue 108 for that category. The message queue 108 subsequently delivers the event message to the subscriber 106.

The send-and-forget nature of publish/subscribe systems can be a drawback, however, when one or more subscribers 102 are unable to process the event messages. This typically occurs when a certain system resource 110 (e.g., a server, a database, etc.) needed to process the event messages is unavailable. When this happens, a transaction manager (not expressly shown) rolls back or otherwise reverses the attempted transaction with the system resource 110 and sends the event message back to the message queue 108 for redelivery. The sending back of the event message to the message queue 108 and subsequent redelivery normally takes only a few seconds. Unfortunately, a resource outage often lasts longer than a few seconds so that the redelivery also fails and additional redeliveries ensue. After a certain number N of retries, the event message is backed completely out of the message queue 108 to a backout queue 112 for manual intervention, usually by a system operator 114.

As can be seen from the foregoing, current publish/subscribe models are inefficient at best, particularly where downtime for a required system resource is known beforehand (e.g., due to scheduled maintenance, etc.). Accordingly, what is needed is a more efficient way to handle redelivery of failed messages in publish/subscribe systems in particular and in asynchronous communication systems in general. More specifically, what is needed is a way to automatically delay redelivery of such failed messages to give required system resources a chance to recover.

SUMMARY

The disclosed embodiments are directed to methods and systems for redelivering failed messages in asynchronous communication systems. The methods and systems automatically delay redelivery of such failed messages in order to allow required system resources to become available. In one implementation, the methods and systems provide two levels of redelivery: a micro level in which redelivery is attempted right away for a certain number of times, and a macro level in which a certain user-selectable delay is imposed before any additional micro level redeliveries are attempted. After a certain number of unsuccessful macro level redeliveries, the message is backed out to a backout queue for manual intervention by a system operator. Such an arrangement reduces or eliminates the burden on the system operator to manually resolve failed message deliveries.

In general, in one aspect, the disclosed embodiments are directed to a method of publishing an event message from a publisher to at least one subscriber upon occurrence of a predetermined event. The method comprises generating the event message at the publisher upon occurrence of the predetermined event and the event message containing information pertaining to said predetermined event. The method further comprises determining a format of the event message generated at the publisher and designating a section of the event message at the publisher for storing message retry information based on the format of the event message. The method finally comprises publishing the event message from the publisher to at least one subscriber.

In general, in another aspect, the disclosed embodiments are directed to a method of a system for publishing an event message from a publisher to at least one subscriber upon occurrence of a predetermined event. The system comprises at least one subsystem configured to generate the event message at the publisher upon occurrence of the predetermined event, the event message containing information pertaining to the predetermined event. The system further comprises at least one subsystem configured to determine a format of the event message generated at the publisher. The system further comprises at least one subsystem configured to designate a section of the event message at the publisher for storing message retry information based on the format of the event message. The system finally comprises at least one subsystem configured to publish the event message from the publisher to at least one subscriber.

In general, in yet another aspect, the disclosed embodiments are directed to a computer-readable storage medium encoded with computer readable instructions for publishing an event message from a publisher to at least one subscriber upon occurrence of a predetermined event. The computer-readable instructions comprises instructions for generating the event message at the publisher upon occurrence of the predetermined event, the event message containing information pertaining to the predetermined event. The computer-readable instructions further comprises the designation of a section of the event message at the publisher for storing message retry information based on the format of the event message. The computer-readable instructions finally comprises publishing the event message from the publisher to at least one subscriber.

BRIEF DESCRIPTION OF THE DRAWINGS

The foregoing and other advantages of the invention will become apparent from the following detailed description and upon reference to the drawings, wherein.

DETAILED DESCRIPTION

Following is a detailed description of illustrative embodiments with reference to the drawings wherein the same reference labels are used for the same or similar elements.

Throughout this description and the claims, the terms "a" and "an" are intended to mean "one or more."

As alluded to previously, existing asynchronous communication systems have failed message redelivery mechanisms that are inefficient at best because they do not accommodate recovery of required system resources. The disclosed embodiments allow time for required system resources to become available by automatically delaying redelivery of failed messages for a preset, user-selectable amount of time. Such an arrangement is more efficient than existing systems in that it reduces or eliminates the need for a system operator to manually resolve failed message deliveries.

Figure 1:
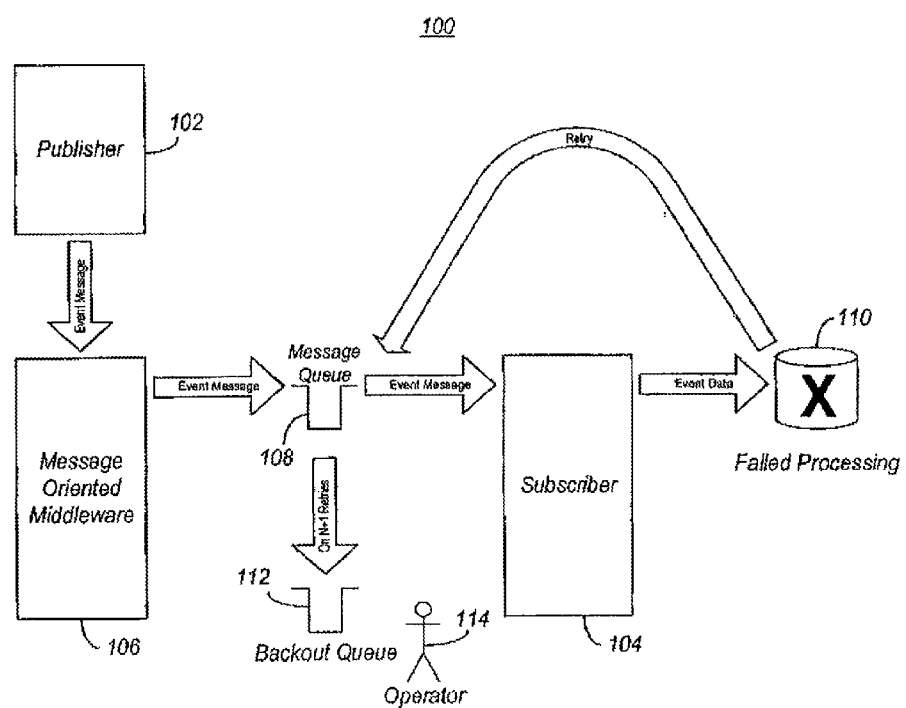
FIG. 1, described previously, illustrates an example of a prior art messaging system.
Figure 2:
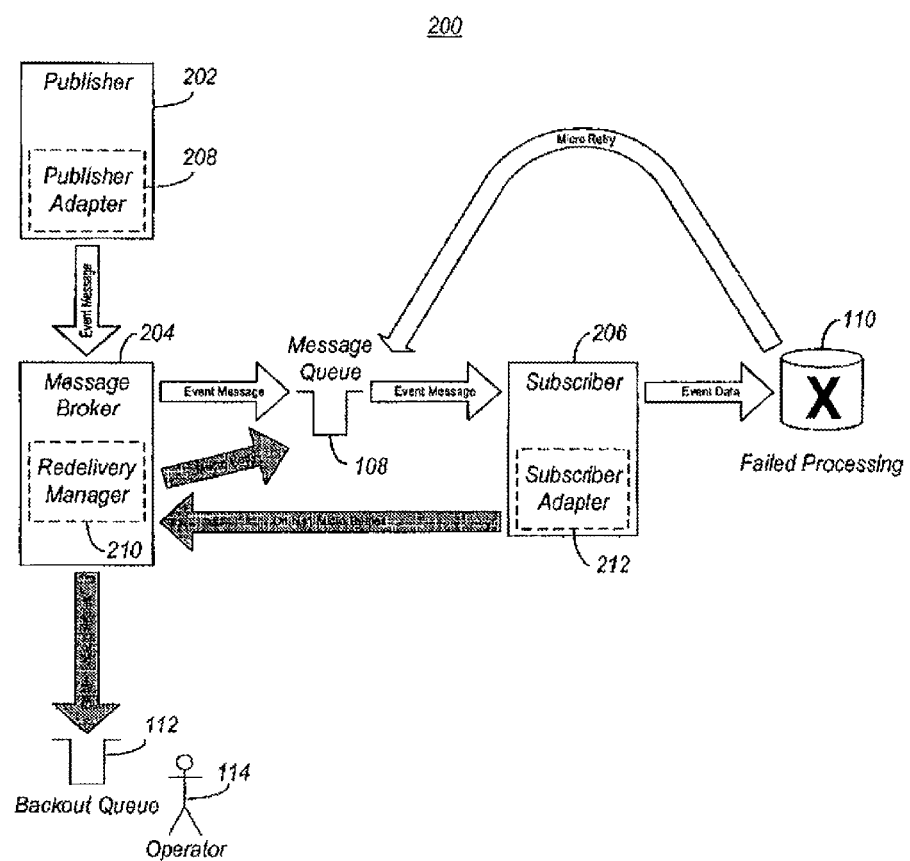
FIG. 2 illustrates an exemplary message redelivery system according to the disclosed embodiments.

Referring now to FIG. 2, an exemplary messaging system 200 capable of redelivering failed messages according to the disclosed embodiments is shown. As can be seen, the messaging system 200 includes at least one publisher 202 connected to a message broker 204 that is in turn connected to at least one subscriber 206 over a network (not expressly labeled). The network may be any suitable network known to those having ordinary skill in the art, including a local area network (LAN), a wide area network (WAN), a private network (intranet), a public network (the Internet), and various combinations thereof. In a similar manner, the messaging system 200 may be any suitable system known to those having ordinary skill in the art, including WebSphere Application Server from IBM Corp. and other enterprise application systems.

In general, the publisher 202 publishes information to the message broker 204 about certain events that have occurred, and the message broker 204 relays the event messages to the subscriber 206. The publisher 202 may involve any type of application known to those having ordinary skill in the art, and the events may involve any type of event that is of interest to the subscriber 206. Examples of these events may include device level events (e.g., mouse clicks, keystrokes, etc.), system level events (e.g., emails, print jobs, etc.), enterprise level events (e.g., new server online, etc.), and the like. Other types of events may include business level events, such as a bank fund transfer, insurance claim, customer address change, new account setup, late payment entry, and so forth.

When one of the above events occurs, the publisher 202 publishes an event message about the event to the message broker 204. A publisher adapter 208 associated with the publisher 202 verifies that the publisher 202 is authorized to publish about a particular event. In accordance with some embodiments, the publisher adapter 208 also formats the event message as needed so that it may be subsequently redelivered in accordance with the disclosed embodiments. In particular, the publisher adapter 208 reserves a certain portion of the event message for later insertion of redelivery information, as will be described further herein. The message broker 204, which may be part of a message-oriented middleware, determines which category the event message belongs to and forwards the event message to the appropriate message queue 108 for that category. The message queue 108 subsequently sends the event message to the subscriber 206 for processing.

If the subscriber 206 is unable to process the event message, for example, because the system resource 110 needed to do so is unavailable, then the transaction manager (not expressly shown) rolls back or otherwise reverses the attempted transaction and sends the event message to the message queue 108 for redelivery. The message queue 108 thereafter redelivers the event message immediately to the subscriber 206 in a manner known to those having ordinary skill in the art. Each send-back of an event message by the transaction manager to the message queue 108 is referred to herein as a "micro retry."

In accordance with the disclosed embodiments, the event message is not immediately backed out to the backout queue 112 for manual intervention after a certain number N of micro retries. Instead, the event message is returned to the message broker 204 where a redelivery manager 210 processes the message for redelivery. In one embodiment, the redelivery manager 210 waits a certain user-selectable amount of time, then resubmits the event message back to the message queue 108 for an additional number N of micro retries. The amount of wait time may vary from subscriber to subscriber and may be based, for example, on known or observed downtime of system resources 110 that are frequently (or infrequently) accessed by the subscriber 206. Each resubmission by the redelivery manager 210 to the message queue 108 is referred to herein as a "macro retry." Only after a certain number M of macro retries is the event message backed out to the backout queue 112 for manual intervention.

Figure 3:
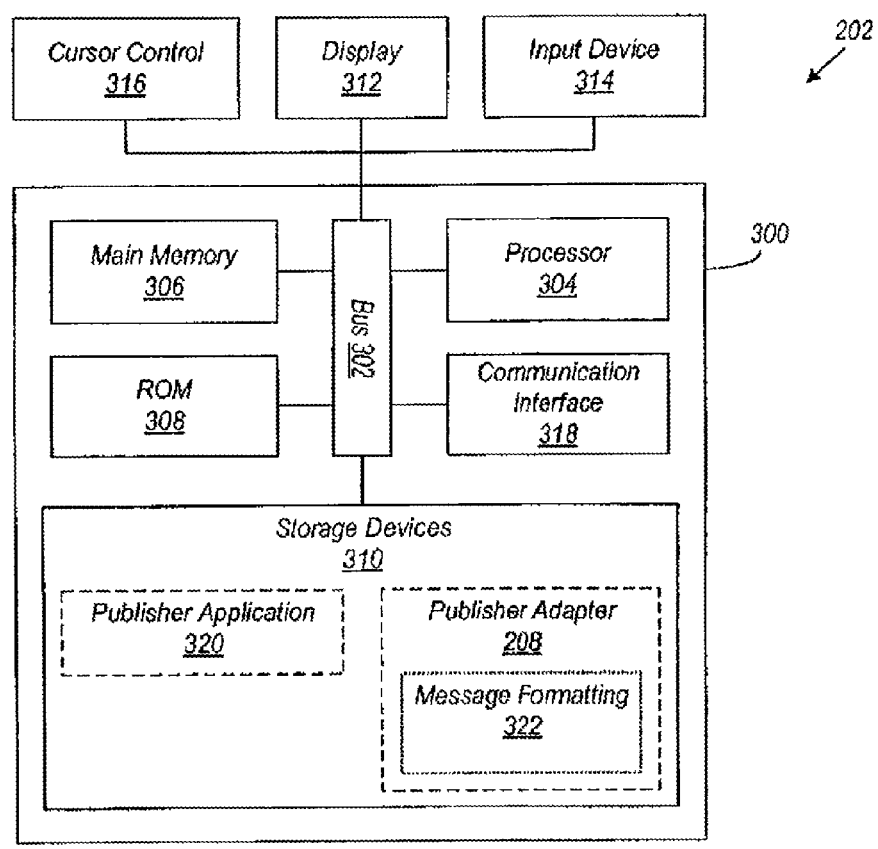
FIG. 3 illustrates an exemplary publisher of the message redelivery system according to the disclosed embodiments.

FIGS. 3-6 illustrate the various components of the exemplary messaging system 200 in more detail according to the disclosed embodiments. Referring first to FIG. 3, an exemplary implementation is shown for the publisher 202 that includes at least one server 300. Any suitable server 300 known to those having ordinary skill in the art may be used for the publisher 202, including a personal computer, workstation, a main frame, and the like. Such a publisher server 300 typically includes a bus 302 or other communication mechanism for communicating information and a processor 304 coupled with the bus 302 for processing information. The publisher server 300 may also include a main memory 306, such as a random access memory (RAM) or other dynamic storage device, coupled to the bus 302 for storing computer-readable instructions to be executed by the processor 304. The main memory 306 may also be used for storing temporary variables or other intermediate information during execution of the instructions to be executed by the processor 304. The publisher server 300 may further include a read-only memory (ROM) 308 or other static storage device coupled to the bus 302 for storing static information and instructions for the processor 304. One or more computer-readable storage devices 310, such as a magnetic disk or optical disk, may be coupled to the bus 302 for storing information and instructions for the processor 304.

The publisher server 300 may be coupled via the bus 302 to a display 312, such as a cathode ray tube (CRT), for displaying information to a user. An input device 314, including, for example, alphanumeric and other keys, may be coupled to the bus 302 for communicating information and command selections to the processor 304. Another type of user input device may be a cursor control 316, such as a mouse, a trackball, or cursor-direction keys for communicating direction information and command selections to the processor 304, and for controlling cursor movement on the display 312. The cursor control 316 typically has two degrees of freedom in two axes, a first axis (e.g., X-axis) and a second axis (e.g., Y-axis), that allow the device to specify positions in a plane.

The term "computer-readable instructions" as used above refers to any instructions that may be performed by the processor 304 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage devices 310. Volatile media may include dynamic memory, such as main memory 306. Transmission media may include coaxial cables, copper wire and fiber optics, including wires of the bus 302. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of the computer-readable media may be involved in carrying one or more sequences of one or more instructions to the processor 304 for execution. For example, the instructions may initially be borne on a magnetic disk of a remote computer. The remote computer can load the instructions into its dynamic memory and send the instructions over a telephone line using a modem. A modem local to the service account security system 202 can receive the data on the telephone line and use an infrared transmitter to convert the data to an infrared signal. An infrared detector coupled to the bus 302 can receive the data carried in the infrared signal and place the data on the bus 302. The bus 302 carries the data to the main memory 306, from which the processor 304 retrieves and executes the instructions. The instructions received by the main memory 306 may optionally be stored on the storage device 310 either before or after execution by the processor 304.

The publisher server 300 may also include a communication interface 318 coupled to the bus 302. The communication interface 318 typically provides a two-way data communication coupling between the publisher server 300 and the network 106. For example, the communication interface 318 may be an integrated services digital network (ISDN) card or a modem used to provide a data communication connection to a corresponding type of telephone line. As another example, the communication interface 318 may be a local area network (LAN) card used to provide a data communication connection to a compatible LAN. Wireless links may also be implemented. Regardless of the specific implementation, the main function of the communication interface 318 is to send and receive electrical, electromagnetic, optical, or other signals that carry digital data streams representing various types of information.

In accordance with the disclosed embodiments, the publisher adapter 208, or rather the computer-readable instructions therefor, may reside on the one or more storage devices 310 along with a publisher application 320. Such a publisher application 320 may be any suitable application known to those having ordinary skill in the art, including a device level application (e.g., mouse, keyboard, etc.), a system level application (e.g., printer, fax, etc.), an enterprise level application (e.g., bank, insurance, customer service, etc.) and the like. The computer-readable instructions for the publisher application 320 and the publisher adapter 208 may then be executed by the processor 304 and/or other components of the publisher server 300 to publish various event messages.

The event messages may take any one of a variety of standard messaging formats, including WebSphere MQ, Open MQ, SonicMQ, and MSMQ. A message formatting component 322 within the publisher adapter 208 ensures that the particular messaging format used can accommodate redelivery of the event messages according to the disclosed embodiments. In particular, the message formatting component 322 is configured to modify the format of the event messages as needed to reserve a certain portion of the event message for storing redelivery information. The specific modification depends on the type of messaging format used, but preferably the modification is made to an available portion of the event message so that it interferes as little as possible with any downstream processing of the message.

Figure 4:
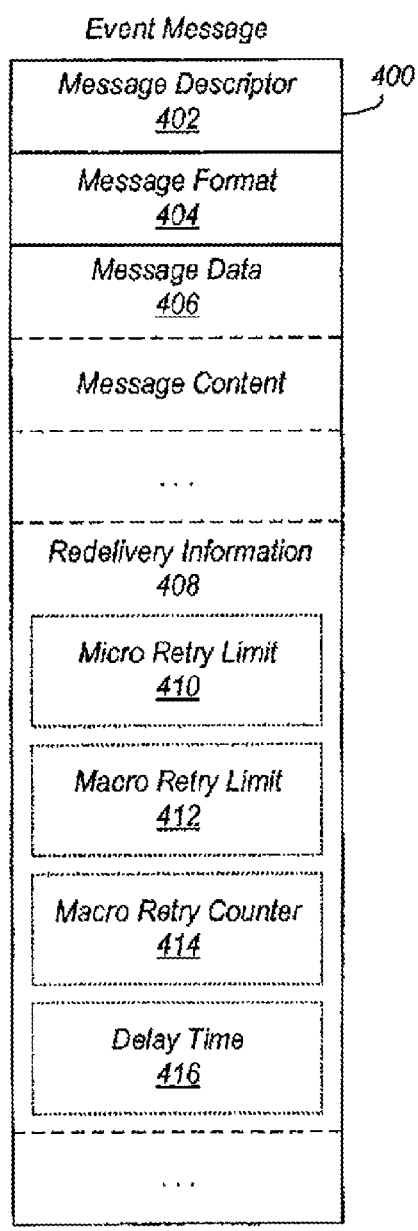
FIG. 4 illustrates an exemplary message format for redelivery according to the disclosed embodiments.

FIG. 4 illustrates an exemplary messaging format 400 according to the disclosed embodiments that has been modified for redelivery according to the disclosed embodiments. The exemplary messaging format 400 shown here is based on the WebSphere Message Broker format from IBM Corp., although other message formats may certainly be used. Such a messaging format 400 typically has one or more predefined portions, including a message descriptor (MQMD) 402, a message format type (MQ RFH2) 404, a data portion 406, and one or more sections within the data portion 406. These predefined portions 402-406 are well known to those having ordinary skill in the art and will therefore not be described in detail here.

In accordance with the disclosed embodiments, an unused area 408 in the data portion 406 (e.g., "usr: folder") may be designated for storing redelivery information. The unused area 408 may be the same area for each type of messaging format 400, or it may be different for each type of messaging format 400. In some embodiments, the redelivery information designation may be achieved by inserting a tag or header into the unused area 408 to indicate that the particular section of the unused area 408 has been reserved for redelivery information. The redelivery information may then be inserted at a point downstream of the publisher application 320 and may include, for example, a maximum number N of micro retries 410, a maximum number M of macro retries 412, a macro retry counter 414, and also a delay time X 416 in preferred embodiments. In general, the maximum number N of micro retries 410 limits the number of micro retries, the maximum number M of macro retries 412 limits the number of macro retries, the macro retry counter 414 tracks the number of macro retry, and the delay time X 416 specifies the wait time between consecutive macro retries. Such redelivery information may then be used to facilitate redelivery of the event message.

Figure 5:
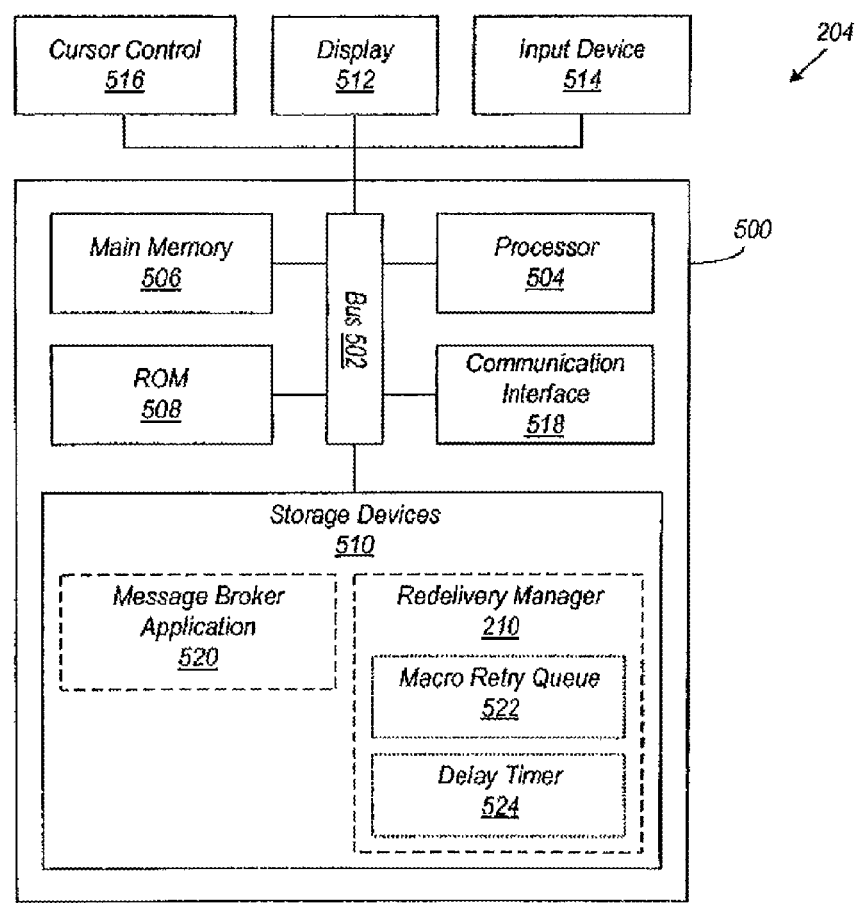
FIG. 5 illustrates an exemplary message broker of the message redelivery system according to the disclosed embodiments.

FIG. 5 illustrates an exemplary implementation of the message broker 204, including at least one server 500. In some embodiments, the message broker server 500 may be similar to the publisher server 300 insofar as it may be a personal computer, a workstation, a main frame, and the like. In addition, the message broker server 500 may have many of the same components as the publisher server 300, including a bus 502, a processor 504, a main memory 506, a read-only memory (ROM) 508, one or more computer-readable storage devices 510, a display 512, an input device 514, a cursor control 516, and a communication interface 518. These components are generally similar in form and function to their counterparts of FIG. 3 and will therefore not be described in detail here.

In accordance with the disclosed embodiments, the redelivery manager 210, or rather the computer-readable instructions therefor, may reside on the one or more storage devices 510 along with a message broker application 520. Such a message broker application 520 may be any suitable application known to those having ordinary skill in the art, including WebSphere Message Broker from IBM Corp. and the like. In addition to the standard message broker functions, in some embodiments, the message broker application 520 may also convert the event messages from one format (e.g., XML) to another (e.g., text). The computer-readable instructions for the message broker application 520 and the redelivery manager 210 may then be executed by the processor 504 and/or other components of the message broker server 500 to redeliver event messages to the subscriber 206.

Operationally, if the subscriber 206 is unable to process an event message after N micro retries, the message is returned to the message broker 204 for disposition by the redelivery manager 210. A macro retry queue 522 in the message broker 204 receives and holds the event message for the redelivery manager 210. The redelivery manager 210 thereafter checks the macro retry counter 414 in the event message to determine whether this particular message has exceeded M macro retries (stored in the unused area 408 of the event message). If not, the redelivery manager 210 increments the macro retry counter 414 and causes a delay timer 524 in the redelivery manager 210 to begin a countdown of an amount of time equal to the delay time X 416 (see FIG. 4) specified in the event message. Upon expiration of the delay timer 524, the redelivery manager 210 resubmits the event message back to the message queue 108 for an additional N micro retries. On the other hand, if M macro retries has been exceeded, then the event message is backed out to the backout queue 112 for manual intervention.

Figure 6:
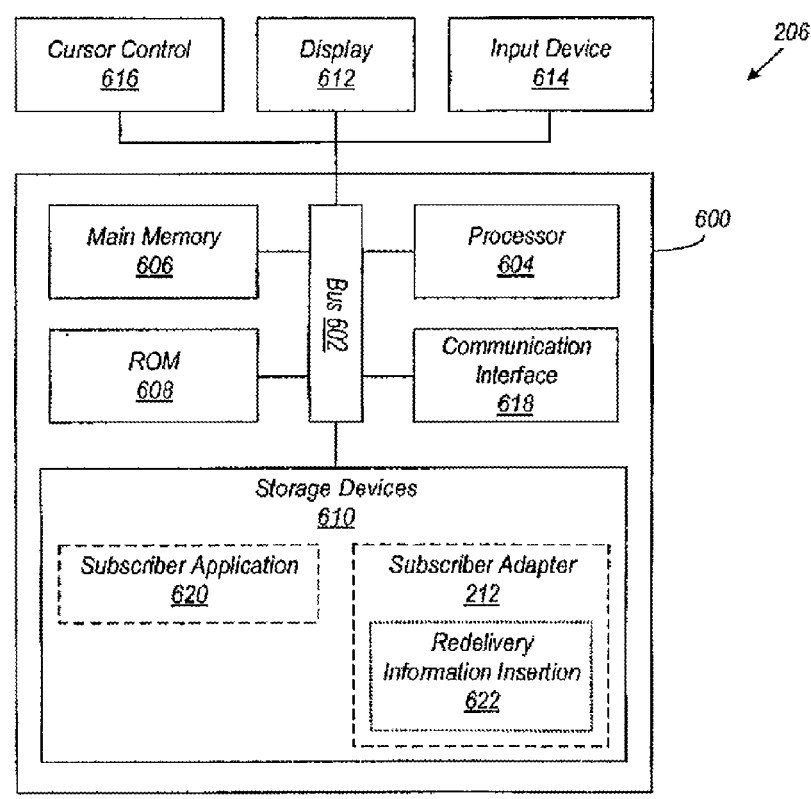
FIG. 6 illustrates an exemplary subscriber of the message redelivery system according to the disclosed embodiments.

FIG. 6 illustrates an exemplary implementation of the subscriber 206, including at least one server 600. As before, the subscriber server 600 may be similar to the publisher server 300 insofar as it may be a personal computer, a workstation, a main frame, and the like. Furthermore, the subscriber server 600 may have many of the same components as the publisher server 300, including a bus 602, a processor 604, a main memory 606, a read-only memory (ROM) 608, one or more computer-readable storage devices 610, a display 612, an input device 614, a cursor control 616, and a communication interface 618. These components are generally similar in form and function to their counterparts of FIG. 3 and therefore a detailed description will again be omitted here.

In accordance with the disclosed embodiments, the subscriber adapter 212, or rather the computer-readable instructions therefor, may reside on the one or more storage devices 610 along with a subscriber application 620. Such a subscriber application 620, like the publisher application 320, may be any suitable application known to those having ordinary skill in the art, including a device level application (e.g., mouse, keyboard, etc.), a system level application (e.g., printer, fax, etc.), an enterprise level application (e.g., bank, insurance, customer service, etc.) and the like. The computer-readable instructions for the subscriber application 620 and the subscriber adapter 212 may then be executed by the processor 604 and/or other components of the subscriber server 600 to redeliver event messages to the subscriber 206.

A redelivery information insertion component 622 associated with the subscriber adapter 212 inserts redelivery information into the event message upon initial reception of the message at the subscriber 206. Such redelivery information may be provided, for example, in the unused area 408 (see FIG. 4) designated by the message formatting component 322 (see FIG. 3). This information may include, for example, the maximum number N of micro retries 410 mentioned previously in FIG. 4. A micro retry counter 624 may be implemented in the subscriber adapter 212 for tracking the number of micro retries. In some embodiments, the redelivery information insertion component 622 may also place the maximum number M of macro retries 412 as well as the delay time X 416 described above with respect to FIG. 4 in the event message. The value for the delay time 416 may be selected by the user according to the requirements of the messaging system 200 such that each subscriber 206 may use the same delay time 416, or different subscribers 206 may use varying delay times 416 according the specific subscribers 206. This value for the delay time 416 may be stored in an appropriate configuration file (not expressly shown) of the subscriber adapter 212.

In operation, the message queue 108 forwards the event message to the subscriber adapter 212 for determining whether the micro retry counter 624 has exceeded N micro retries (stored in the unused area 408 of the event message). If it has not, then the subscriber adapter 212 verifies that the event message conforms to the business logic of the subscriber application 320. The subscriber adapter 212 thereafter forwards the message to the subscriber application 320 for processing. If processing fails (e.g., due to a system or resource problem), the transaction manager rolls back any attempted transaction, increments an internal micro retry counter provided by the transaction manager framework (e.g., WebSphere MQ configured as the Java Message Service (JMS) provider), and returns the message to the message queue 108 for immediate retry. Upon retry, the subscriber adapter 212 again determines whether the micro retry counter has been incremented above N micro retries and, if not, repeats the process described above.

Should the micro retry counter exceed N micro retries, the subscriber adapter 212 does not forward the message to the subscriber application 320 for processing. Instead, the subscriber adapter 212 forwards the message to the macro retry queue 522 of the redelivery manager 210. Upon receiving the event message in its macro retry queue 522, the redelivery manager 210 checks to see whether the macro retry counter 414 has exceeded M macro retries. If it has not, the redelivery manager 210 starts the delay timer 524 by setting it to "sleep" for a delay period equal to the delay time X 416. When the delay timer expires, the event message is then transported back to the message queue 108 for another round of N micro retries.

If the new round of N micro retries is successful, then no additional macro retry is needed. Otherwise, the subscriber adapter 212 intervenes again after N micro retries to send the event message back to the message broker 210 for another macro retry after delaying for the duration of the delay time X 416. Once the number M of macro retries is exceeded, however, no further macro retries are attempted and the event message is backed out to a backout queue 112 specified by the subscriber 206 for manual intervention (i.e., because the problem did not resolve itself during automation).

The foregoing description of the messaging system 200 (see FIG. 2) according to the disclosed embodiments is of a general nature. Following now is a description of a specific implementation of the messaging system 200 and the various components thereof using WebSphere Message Broker from IBM Corp. and the Java programming language (e.g., J2EE). Of course, those having ordinary skill in the art will understand that other object-oriented programming languages (e.g., C++, etc.) and other enterprise messaging systems may be used (e.g., MSMQ from Microsoft Corp., SonicMQ from Progress Software Corp., etc.) without departing from the scope of the disclosed embodiments.

In the following exemplary implementation, the subscriber 206 is a Java message-driven bean (MDB) superclass provided by the enterprise infrastructure for the event of interest, and the root MDB is the subscriber adapter 212. WebSphere MQ is configured as the Java Message Service (JMS) provider to the WebSphere Application Server. The subscriber 206 merely subclasses this infrastructure MDB and implements an execute( ) method. The infrastructure code in the MDB then runs as the listener service, receives the event messages, pre-processes them, and then forwards the event structure when it transfers control to the business logic by invoking the event( ) method. Rollbacks are handled by the MDB container managed transaction capability (XA) (and initiated by the subscriber 206 simply by throwing an exception in the execute( ) method). The subscriber 206 configures the listening port parameters for the message queue 108 to have a maximum number of retries set at a value at least one more than the actual number of retries desired for the business logic to attempt.

On the first retry beyond the subscriber's retry limit, the subscriber adapter 212 sends the event message back to the redelivery manager 210 for a delayed macro retry. The subscriber 206 should place a properties file in the classpath with parameters used to configure the subscriber adapter 212. One such parameter is the maximum number of micro retries, or micro_rty_max in this implementation. This micro_rty_max serves as the limit on the number of micro retries by the subscriber adapter 212. Another parameter is the maximum number of macro retries, or macro_rty_max in this implementation. This macro_rty_max serves as the limit on the number of delayed macro retries by to the redelivery manager 210. Another parameter is the delay period, or macro_rty_wait in this implementation. This macro_rty_wait serves as the number of minutes the subscriber 206 wants the event message to be held on the redelivery manager 210 before it is placed back on the subscriber's message queue 108. The name of the message broker's macro retry queue 522 should be placed in the properties file, as should the name of the subscriber's final backout queue 112. These and other parameters may be placed by the subscriber adapter 212 in the "usr: folder" of the data area of the MQ RFH2 header used in each event message in order to transmit them back and forth to the redelivery manager 210.

The event infrastructure includes the subscriber adapters 212 and several message flows on the redelivery manager 210 platform. Some of the message flows service the delayed macro retry behind the macro retry queue 522. The main message flow involved in this function determines if the message has exceeded its macro retry limit. If the macro retry maximum is exceeded, the main message flow dispatches the event message to the subscriber's backout queue 112. If not, it dispatches it to other message flows that involve timer functions available, for example, in IBM Message Broker v6. Based on the delay setting, this current implementation sends the message to various queues that are served by timers of preset values. The decision is made to place the message into a preset delay queue close to the configured delay time (i.e., the next predefined time that is greater than the requested time). In some embodiments, the messages are written to a database and a "heartbeat" message flow retrieves them for redelivery more closely to their configured delay time.

By way of a demonstration, in one example, several applications have subscribed to a customer change of address event. One of the subscribers is configured with micro_rty_max=3, macro_rty_max=4, and macro_rty_wait=10 minutes. This particular subscriber writes the new customer addresses into a database that is normally available except for an occasional seven-minute outage for maintenance on Sunday mornings. Unfortunately, a change of address event arrives at the subscriber's input queue one minute after the database shuts down on Sunday morning. The subscriber adapter in the MDB gets the event message, prepares it, and calls the business logic via execute( ). The SQL statements to insert the address data fail because of a lost database connection and an exception is thrown. The MDB container recognizes this as a cause for an XA rollback and issues the transaction rollback. The original message is now at the front of the queue again and is processed with the same results, so that again the processing is repeated for a third time. A fourth attempt is started (because the listener queue's max retry limit is correctly configured for some number>micro_rty_max), and the subscriber adapter recognizes that micro_rty_max is exceeded. The subscriber adapter updates the event message with the configured retry parameters, increments the count of round trips initiated (now "1"), and puts it to the message broker's retry queue. Ten minutes later, the broker's timer goes off (because macro_rty_wait was set to "10") and the message is sent back to the subscriber's input queue for a second round of retries (because 2 is less than macro_retry_max, which is "4"). This time the subscriber receives the message and is able to insert it in the database because, as usual, the database was only down seven minutes, which fits within the delayed retry wait time of 10 minutes. No system operator intervention was required to recover from this normal maintenance outage window.

In a second example, the subscribing system and its settings are identical to the previous example. However, in this example, the message arrives again one minute after the database is shut down on Sunday morning. The three immediate tries are rolled back and on the fourth read, the subscriber adapter once again forwards the message back to the message broker for a delayed retry. After 10 minutes of delay, the message is again forwarded to the subscriber's input queue. This time, the database is still down. Three more failed tries are attempted and rolled back and on the fourth read, the message is sent back to the message broker for a second delayed retry. After another 10 minutes, the message is placed back on the subscriber's message queue, but the database is still down. The immediate retries are once again exceeded, and the message is sent back to the message broker for a third delayed retry. On the third round of immediate retries at the subscriber, the database is still down, and therefore the event message is sent back for a fourth delayed retry. On the fourth round of immediate retries, the database is still down, and therefore the message is returned to the message broker for a fifth delayed retry. On this pass, the message broker's delayed retry message flow detects that a fifth redelivery would exceed the macro_rty_max parameter, and therefore the message is instead placed directly on the subscriber's specified backout queue. Because the subscriber support team has configured the system to page an "on call" team member if any messages appear in the backout queue, the team is notified of the outage. When the support team researches the problem, the team realizes that the required database has exceeded its expected outage window. The team may then request that a database support group resolve the problem. After resolution, messages may either be manually moved back to the original input queue, or a copy of the subscribing MDB can be started directly reading the backout queue and then disabled once the backout queue is empty (so that the backout queue depth alerting can be reset).

Figure 7:
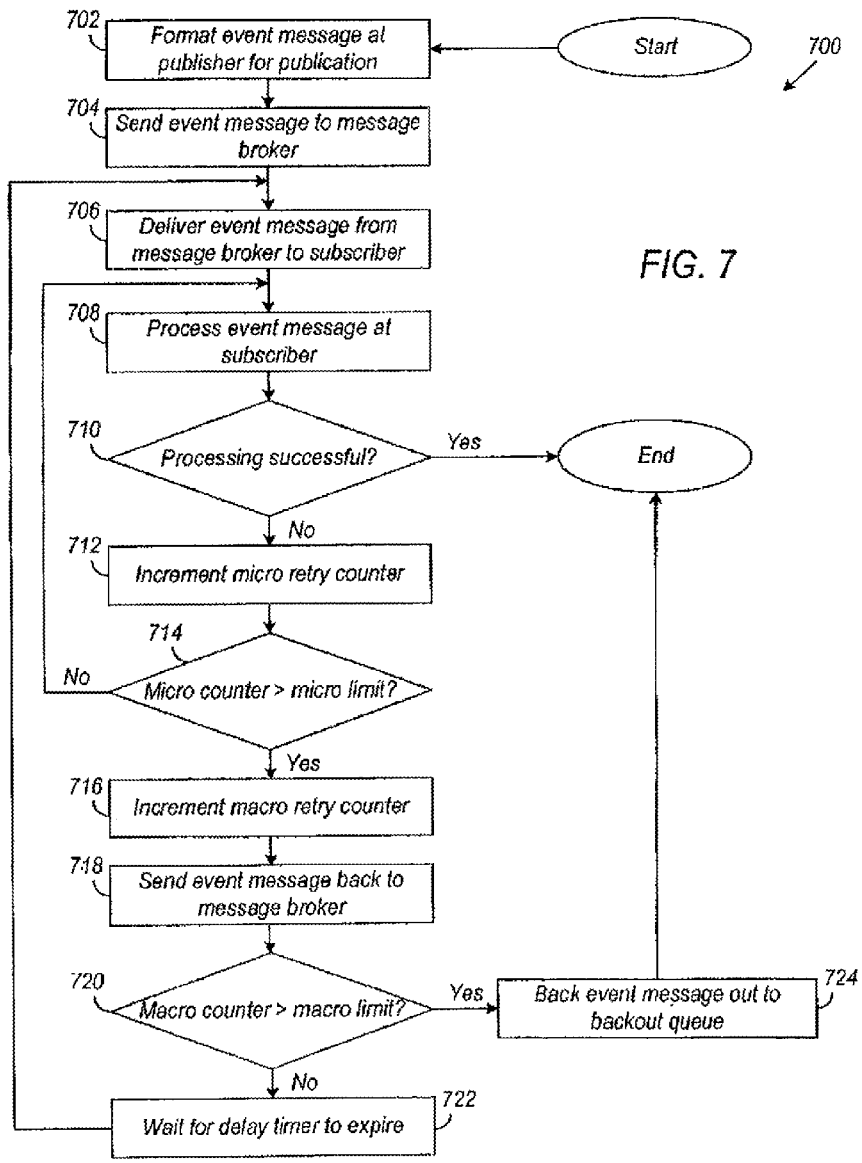
FIG. 7 illustrates an exemplary message redelivery method according to the disclosed embodiments.

The foregoing embodiments may be also implemented in the form of one or more general guidelines or steps. FIG. 7 illustrates an example of a method 700 that may be used to carry out the disclosed embodiments. Although the method 700 is shown as being composed of a plurality of discrete steps, those having ordinary skill in the art will understand that two or more of these steps may be combined into a single step, and that any individual step may be divided into several constituent steps as needed. Moreover, although the steps are shown in a particular sequence, those having ordinary skill in the art will recognize that one or more of the steps may be performed out of sequence without departing from the disclosed embodiments.

As can be seen, the method 700 begins at step 702 where an event message is formatted in order to facilitate redelivery in accordance with the disclosed embodiments. Such formatting typically takes place at the publisher prior to publication of the event message. The message is then published at step 704 to a message broker and subsequently delivered to one or more subscribers at step 706 based on either the topic of the message or the content of the message, or a combination of both. At step 708, the event message is processed at the subscriber. Such processing may include, for example, removing any envelope information, checking for any business logic exceptions, logging the message, inserting redelivery parameters into the message, updating one or more system resources with the content of the message, and the like.

At step 710, a determination is made as to whether the processing in the previous step was successful, particularly with respect to updating the system resource. If successful, then the method is ended. Otherwise, a micro retry counter is updated at step 712 and a determination is made at step 714 as to whether the micro retry counter has exceeded a certain micro retry limit. If the micro retry limit has not been exceeded, then the method 700 immediately tries to process the event message again by returning to step 700. If the micro retry limit has been exceeded, then at step 716 a micro retry counter is incremented, and the message is sent back to the message broker at step 718.

At step 720, a determination is made at the message broker as to whether the macro retry counter has exceeded a certain micro retry limit. If it has not, then at step 722, the message broker waits a certain amount of time that is specified in the event message. The method 700 thereafter tries to deliver the event message again by returning to step 706. However, if it has been determined at step 720 that the macro retry counter has exceeded the macro retry limit, then the method 700 backs the event message out to a backout queue at step 724 for manual intervention.

In some embodiments, instead of the micro retry counter being tracked by the transaction manager framework, those having ordinary skill in the art will understand this counter may be just as easily stored and incremented in the event message, or possibly in the subscriber adapter. Similarly, instead of the macro retry counter being stored and incremented in the event message, this counter may be implemented in the redelivery manager of the message broker. Likewise, one or more of the maximum number N of micro retries, the maximum number M of macro retries, and the delay time X may be stored in and/or set by the subscriber adapter or possibly the redelivery manager. Furthermore, instead of the publisher adapter performing the formatting of the event message to receive redelivery information, the subscriber adapter may be responsible for formatting the event message.

Moreover, in some embodiments, redelivery of the event message is not limited to just the subscriber, but may also be available at the publisher. For example, it may be desirable in some situations to enrich the event message from the publisher prior to delivering the message to the subscribers. Such a situation may arise, for instance, when a publishing application only has access to an internal or proprietary version of information to be published (e.g., two letter state code instead of full state name, numeric product code instead of full product description, etc.). It may be useful before publishing such information to enrich the information by adding an enhanced version of the information (e.g., full state name, full product description, etc.). One way to accomplish this enrichment is for the message broker to access a system resource (e.g., a database, etc.) as the event message is passing through and insert or append the enhanced information. Instructions for enriching the event message (e.g., which information to enhance, which system resource to use, etc.) may be provided by the publisher in the routing list for that event message.

As sometimes happens with the subscribers, however, the system resource needed by the message broker to enrich the event message may be unavailable for various reasons. When this occurs, in accordance with some disclosed embodiments, the message broker may use the same infrastructure described previously with respect to the delayed macro retry (see FIG. 5) to carry out a delayed retry of the enrichment step (or any other step that may be taken prior to replicating the event message for publishing). In a similar manner, the enrichment retry information used by the message broker to carry out the delayed enrichment retry may be stored in the unused area of the event message reserved by the publisher adapter (see FIGS. 3-4). Based on this retry information, the message broker may wait a predefined period of time, then attempt the enrichment (or any other step prior to replication) again, incrementing a retry counter (which may be the same as the macro retry counter) with each attempt. After a certain maximum number of unsuccessful delayed retries (which may be specified in the event message) has been exceeded, the message broker may back the event message out to a predefined backout queue specified by the publisher adapter.

Figure 8:
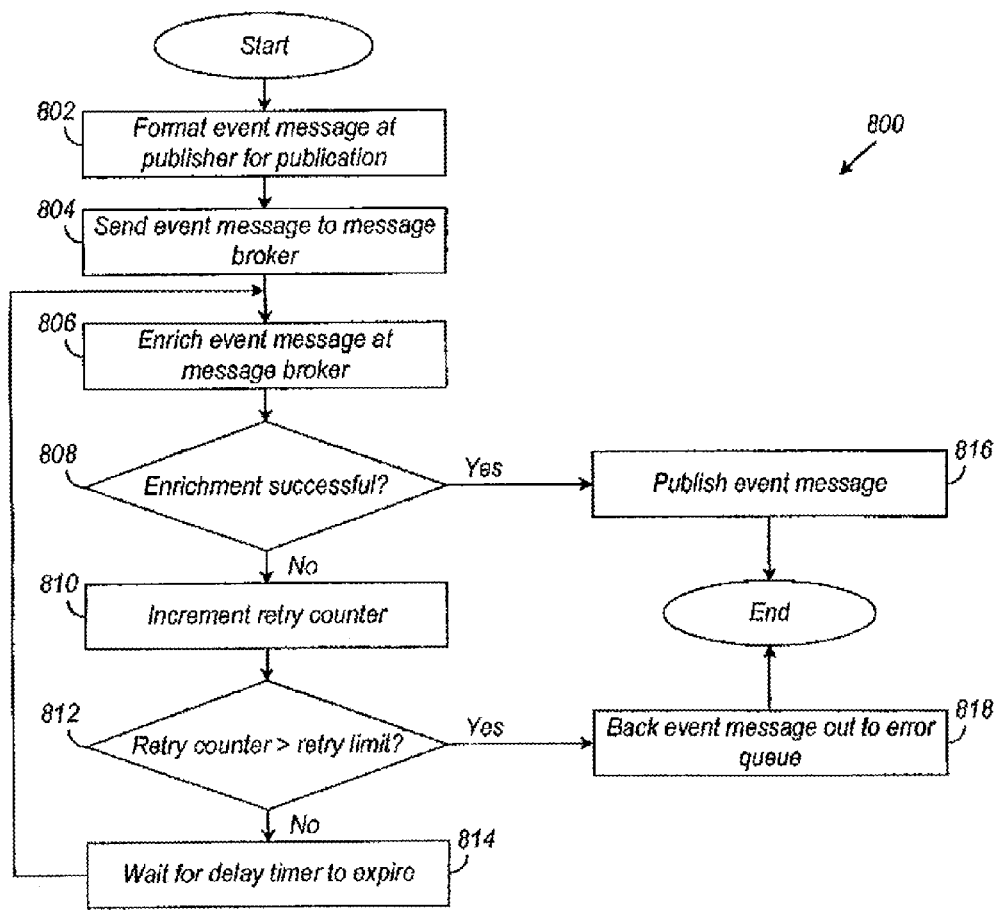
FIG. 8 illustrates another exemplary message redelivery method according to the disclosed embodiments.

FIG. 8 illustrates an exemplary method 800 for implementing the above delayed enrichment retry according to some disclosed embodiments. As can be seen, the method 800 begins at step 802, where the publisher adapter formats the event message in the manner described previously so as to reserve an unused area of the event message for storing delayed enrichment retry information. At step 804, the publisher adapter sends the event message to the message broker. If the routing list for the event message contains the appropriate designations, the message broker attempts to enrich the event message at step 806. A determination is made at step 808 as to whether the enrichment is successful. If the answer is no, then at step 810, an enrichment retry counter in the event message is incremented. At step 812, another determination is made as to whether the enrichment retry counter has exceeded a maximum number of enrichment retries. If the answer is no, then the message broker waits at step 814 for a predefined period of time (as specified in the event message). The method 800 thereafter attempts to enrich the event message again by returning to step 806.

If the determination at step 808 deems that the enrichment was successful, then at step 816, the event message is published and no further retries are needed (i.e., the method 800 is ended). Similarly, if the determination at step 812 concludes that the maximum number of enrichment retries has been exceeded, then at step 818, the event message is backed out to a backout queue specified by the publisher adapter and no further retries are made (i.e., the method 800 is ended).

While the disclosed embodiments have been described with reference to one or more particular implementations, those skilled in the art will recognize that many changes may be made thereto. For example, the delayed retry/redelivery processes described herein may be implemented independently of whether the event messages are "published." That is, any means known to those having ordinary skill in the art for providing the event messages to the message broker and subscriber adapter may be used. For example, an application may be configured to read messages from a queue according to a sequence of rules regardless of whether the messages are originally "published" (although wherein the messages have landed on the queue). Thus, the disclosed embodiments broadly solve a queue consumption problem and not necessarily just a publisher/subscriber problem. Therefore, each of the foregoing embodiments and obvious variations thereof is contemplated as falling within the spirit and scope of the disclosed embodiments, which is set forth in the following claims.

What is claimed is:

1. A system comprising:
a processor; and
memory storing instructions that cause the processor to effectuate operations, the operations comprising:
modifying a message format of an event message upon occurrence of a predetermined event, said event message containing information pertaining to said predetermined event, said message format defining a data portion and an unused portion after modification;
storing message retry information to the unused portion based on said message format; and
publishing said event message to at least one subscriber.

2. The system according to claim 1, further comprising:
verifying that a publisher of the event message is authorized to publish the event message related to the predetermined event.

3. The system according to claim 1, wherein said retry information is stored to the unused portion at a point downstream of the publisher.

4. The system according to claim 1, wherein said message retry information includes one or more of the following: a maximum number of immediate retries, a maximum number of delayed retries, a delayed retry counter, and a delay time.

5. The system according to claim 1, wherein said predetermined event includes a business level event.

6. The system according to claim 5, wherein said retry information includes information needed to retry an enrichment of said event message after waiting a predefined delay time.

7. The system according to claim 4, said delay time is based on downtime of system resources associated with one or more of the at least one subscriber.

8. A method comprising:
determining a message format of an event message associated with occurrence of a predetermined event, said event message containing information pertaining to said predetermined event;
modifying the message format of said event message, said message format designating a section of an unused portion for storing message retry information based on said format of said event message after modification; and
publishing said event message to at least one subscriber.

9. The method according to claim 8, wherein said predetermined event includes one or more of the following: a device level event, a system level event, and an enterprise level event.

10. The method according to claim 8, wherein said publisher is a business application, said business application including one or more of the following: a banking application, an insurance application, and a customer service application.

11. The method according to claim 8, further comprising:
retrying publication of said event message to the at least one subscriber based on said message retry information,
wherein said message retry information includes one or more of the following: a maximum number of immediate retries, a maximum number of delayed retries, a delayed retry counter, and a delay time.

12. The method according to claim 8, wherein said unused portion includes a tag or header.

13. The method according to claim 12, wherein said retry information includes information needed to retry an enrichment of said event message after waiting a predefined delay time, the predefined delay time varies between two or more of the at least one subscriber.

14. The method according to claim 8, wherein said event message is published from said publisher to said at least one subscriber in an asynchronous manner.

15. A non-transitory computer-readable storage medium that is not a propagating signal, the non-transitory computer-readable storage medium encoded with computer readable instructions that cause a processor executing the computer readable instructions to effectuate operations, the operations comprising:

determining a message format of an event message associated with occurrence of a predetermined event, said event message containing information pertaining to said predetermined event;

modifying the message format of said event message, said message format designating a section of an unused portion of said event message for storing message retry information based on said format of said event message after modification; and publishing said event message to at least one subscriber.

16. The non-transitory computer-readable storage medium that is not a propagating signal according to claim 15, said message format based on downstream processing of the event message after modification.

17. The non-transitory computer-readable storage medium that is not a propagating signal according to claim 15, wherein said retry information includes information needed to retry a customer change of address event.

18. The non-transitory computer-readable storage medium that is not a propagating signal according to claim 15, wherein said message retry information includes one or more of the following: a maximum number of immediate retries, a maximum number of delayed retries, a delayed retry counter, and a delay time.

19. The non-transitory computer-readable storage medium that is not a propagating signal according to claim 18, wherein said delay time is stored in a subscriber configuration file.

20. The non-transitory computer-readable storage medium that is not a propagating signal according to claim 15, wherein said subscriber inserts message retry information on receipt of said event message.

* * * * *